United States Patent [19]

Troutman et al.

[11] Patent Number: 5,078,948
[45] Date of Patent: Jan. 7, 1992

[54] ARROWHEAD TIP BLOW NEEDLE AND METHOD OF USING THE NEEDLE TO BLOW MOLD AN ARTICLE

[75] Inventors: James D. Troutman, Brooklyn; Thomas W. Parr, Ann Arbor, both of Mich.

[73] Assignee: Ford Motor Company, Dearborn, Mich.

[21] Appl. No.: 693,214

[22] Filed: Apr. 30, 1991

[51] Int. Cl.$^5$ ............................................. B29C 49/60
[52] U.S. Cl. .................................. 264/526; 264/154; 264/523; 264/540; 425/536
[58] Field of Search ............... 264/526, 154, 155, 156, 264/523, 524, 540, 542, 543; 425/536, 527, 290

[56] References Cited

U.S. PATENT DOCUMENTS

| | | | |
|---|---|---|---|
| 3,167,817 | 2/1965 | Zalkind | 18/34 |
| 3,450,805 | 6/1969 | Chesser | 264/28 |
| 3,457,590 | 7/1969 | Dittman | 264/540 |
| 3,592,886 | 7/1971 | Havely | 264/526 |
| 3,821,344 | 6/1974 | Peters | 264/93 |
| 4,859,397 | 8/1989 | Peters | 264/529 |

FOREIGN PATENT DOCUMENTS 60-025725  2/1985  Japan .................................. 264/523

*Primary Examiner*—Jan H. Silbaugh
*Assistant Examiner*—Catherine Timm
*Attorney, Agent, or Firm*—Damian Porcari; Clifford L. Sadler

[57] ABSTRACT

An apparatus for producing a blow-molded article including a mold having operable die pieces and a passage through at least one of the die pieces for receiving the needle. The needle includes a tubular portion and a cutting tip atop the tubular portion. The cutting tip has three or more blades terminating into a point. The tubular portion has one or more passages communicating with a source of pressurized fluid. The needle is operated to pierce a parison. The arrowhead-tipped needle is used in a method of manufacturing a blow-molded article. A hollow parison is placed within a cavity of a mold. The mold is closed about the parison and a needle is moved to pierce the parison. The needle penetrates the parison and forms flap sections in the parison. The needle tip pushes the flap sections inwardly within the parison.

12 Claims, 3 Drawing Sheets

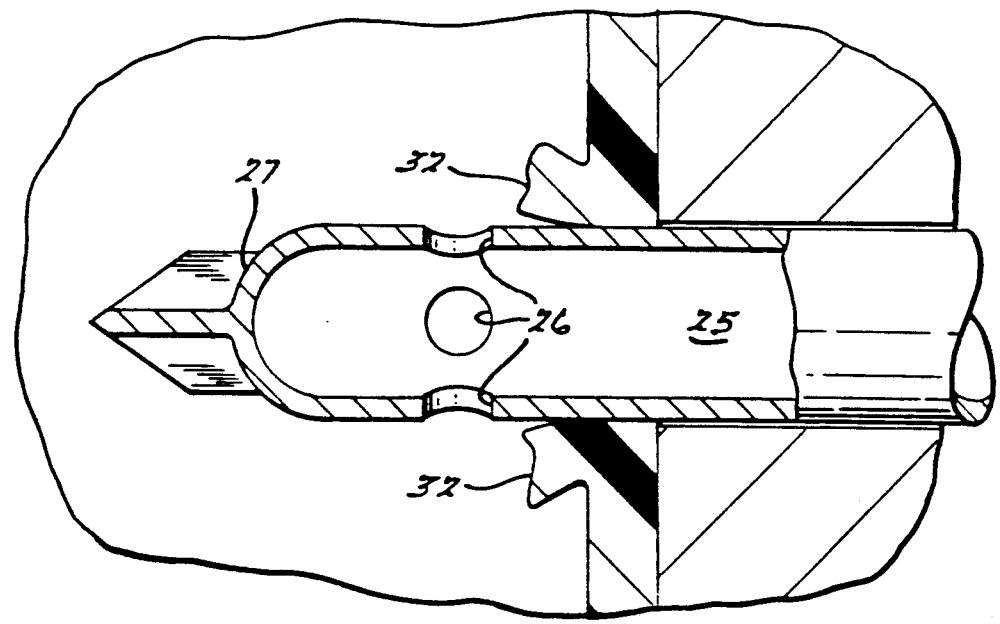
FIG. 5.
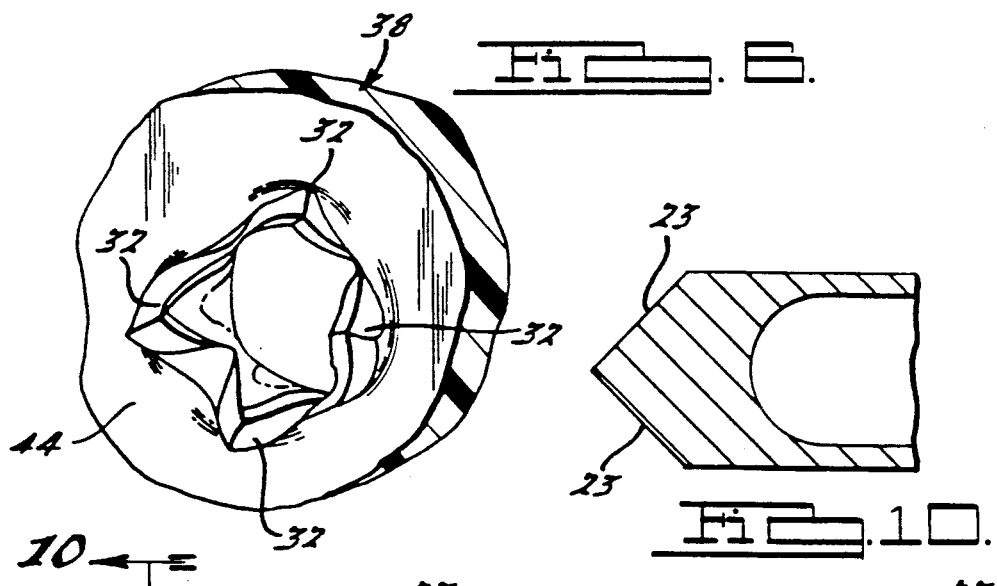
FIG. 6.
FIG. 10.
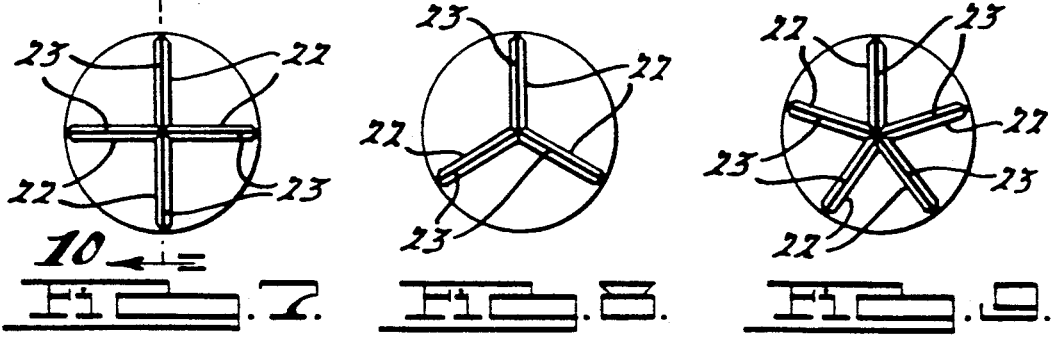
FIG. 7.  FIG. 8.  FIG. 9.

ARROWHEAD TIP BLOW NEEDLE AND METHOD OF USING THE NEEDLE TO BLOW MOLD AN ARTICLE

FIELD OF THE INVENTION

The present invention relates to an apparatus for producing blow-molded articles. More specifically, the invention relates to an arrow-tipped blow-molding needle.

BACKGROUND OF THE INVENTION

It is desirable to produce blow-molded articles which are free of cutout plugs using conventional blow-molding needles. Cutout plugs are formed by a hollow-tipped blow-molding needle piercing a parison.

Conventional blow-molding needles are generally an extended tube terminating in a bevelled tip. The perimeter of the tubular portion acts as a cutting surface. These needles are herein referred to as hollow-tipped. Hollow-tip blow-molding needles penetrate a parison wall by cutting a circular opening in the parison. A circular cutout plug is produced. The cutout interferes with subsequent processing of the blow-molded article. The cutout may fall within the molded article requiring subsequent removal, or the cutout plug may fold back within the parison and adhere to the back wall of the parison. The cutout plug may interfere with subsequent processing of the molded article, or may become detached after the blow molding. Subsequent detachment may interfere with the operation of the molded article by clogging passages or produce rattles.

U.S. Pat. No. 4,859,397 issued to Peters, Aug. 22, 1989 and incorporated herein by reference teaches the blow molding a parison using a hollow-tipped blow-molding needle. A hollow-tipped blow-molding needle comprising a hollow tube having a beveled portion tapering into a sharp point is used to pierce a parison. The blow-molding needle is actuated linearly between a retracted and extended position in a die piece. It is believed that as the hollow-tipped needle pierces the parison, a circular cutout is created. The cutout either falls within the parison and is subsequently removed or folds back upon the interior parison wall. A shoulder sealing having one or more projections, aids in sealing between the parison and needle.

U.S. Pat. No. 3,450,805, issued to Chesser, June 17, 1969 also teaches a process of blow-molding a molded article. An extruder extrudes a length of thermoformable parison. A mandrel partially inflates the parison. Mold die pieces close about the parison pinching the parison closed. A bevel pointed blow-molding needle having one or more outlets near the pointed end pierces the parison. The outlets are arranged around the periphery of the point bevel. This arrangement causes fluid flowing through the needle to diffuse at the outlets and prevent blistering of the parison. The bevel-pointed blow-molding needle eliminates the cutout but is difficult to use when blow-molding relatively thick parisons on the order of 4-7 mm. The bevel-point is believed to form an extended ridge around the interior perimeter of the parison opening. This extended ridge may interfere with subsequent processing of the molded article.

U.S. Pat. No. 3,821,344, issued to Peters, June 28, 1974 teaches a bevel point or knife edge for a mandrel that pierces the parison after the molded article is fully inflated by a blow pin. The mandrel sizes an opening in the parison for a neck portion. The knife edge is not used for a blow-molding needle.

U.S. Pat. No. 3,167,817 issued to Zalkind Feb. 2, 1965, teaches a four-bladed Phillips screwdriver bit for boring a blow-molded article The bit is ground to a sharp point. Flutes on the bit have sharp edges to effect a grinding or cutting away of the plastic material. The bit is not used as a needle and does not pierce a parison. Rather, this bit is used to bore through a molded article.

It is desirable to provide a method of blow-molding a parison which eliminates a cutout from a blow-molding needle. It is also desirable to provide an arrow-tipped blow-molding needle which pierces a parison wall to form flap sections. The flap sections fold inward against the parison wall. It is still a further object of the present invention to provide a blow-molding needle which reduces the amount of debris collected in a blow-molding needle.

SUMMARY OF THE INVENTION

The present invention provides an apparatus for producing a blow-molded article comprising a mold having operable die pieces and a passage through at least one of the die pieces for receiving the needle. The needle comprises a tubular portion and a cutting tip atop the tubular portion. The cutting tip has three or more blades terminating into a point. The tubular portion has one or more passage communicating with a source of pressurized fluid. The needle is operated to pierce a parison.

Also provided in the present invention is a method of manufacturing a blow-molded article using an arrowhead-tipped needle. A hollow parison is placed within a cavity of a mold. The mold is closed about the parison and a needle is moved to pierce the parison. The needle penetrates the parison and forms flap sections in the parison. The needle tip pushes the flap sections inwardly within the parison.

The blow-molding needle of the present invention comprises a tubular portion having an interior diameter sufficient to supply a volume of air to a parison for blow-molding. Atop one end of the tubular portion is an arrowhead-shaped cutting tip. The cutting tip comprises three or more cutting blades terminating into a sharp point. The number of cutting blades are dependent upon the wall thickness of the parison and the diameter of the blow-molding needle. More cutting blades are generally required when cutting thicker parisons or using larger diameter blow-molding needles. The blow-molding needle is positioned generally perpendicular to the parison wall and moved linearly. The cutting tip pierces the parison wall. The cutting blades form flap sections in the parison wall. The flap sections are formed between the cutting blades. The end of the cutting tip is closed to the passage of air and is generally shaped to assist in pushing the flap sections inwardly within the parison wall.

Located near the cutting tip are passages for inflating and ventilating the parison. The passages are spaced perpendicular to the tubular portion. Because the passages are spaced away from and perpendicular to the cutting surface, small bits of debris caused by the needle piercing the parison do not enter the passages. Ventilating the parison through these side passages reduces the maintenance of the blow-molding equipment.

In accordance with the present invention there is provided a blow-molding needle which penetrates a parison wall without producing a cutout plug. The invention eliminates the need for removing a cutout plug when producing blow-molded articles. Arrowhead shaped cutting blades pierce a parison wall to form flap sections which are pushed inward within the parison. The flap sections do not detach from the parison or interfere with subsequent processing. These and other objects, features and advantages of the present invention will become more apparent to one of ordinary skill in the art upon reference to the accompanying drawings and detailed description provided below.

BRIEF DESCRIPTION OF THE DRAWINGS

FIG. 5 is a close-up view of a portion of the apparatus shown in FIG. 3.

FIG. 6 is a perspective view of the interior face of a parison which has been pierced by a blow-molding needle of the present invention.

FIGS. 7-9 are various arrow shapes for cutting tips.

FIG. 10 is a sectional view of a blow molding needle taken along the line X—X of FIG. 7.

DETAILED DESCRIPTION OF THE DRAWINGS

Figure 1:
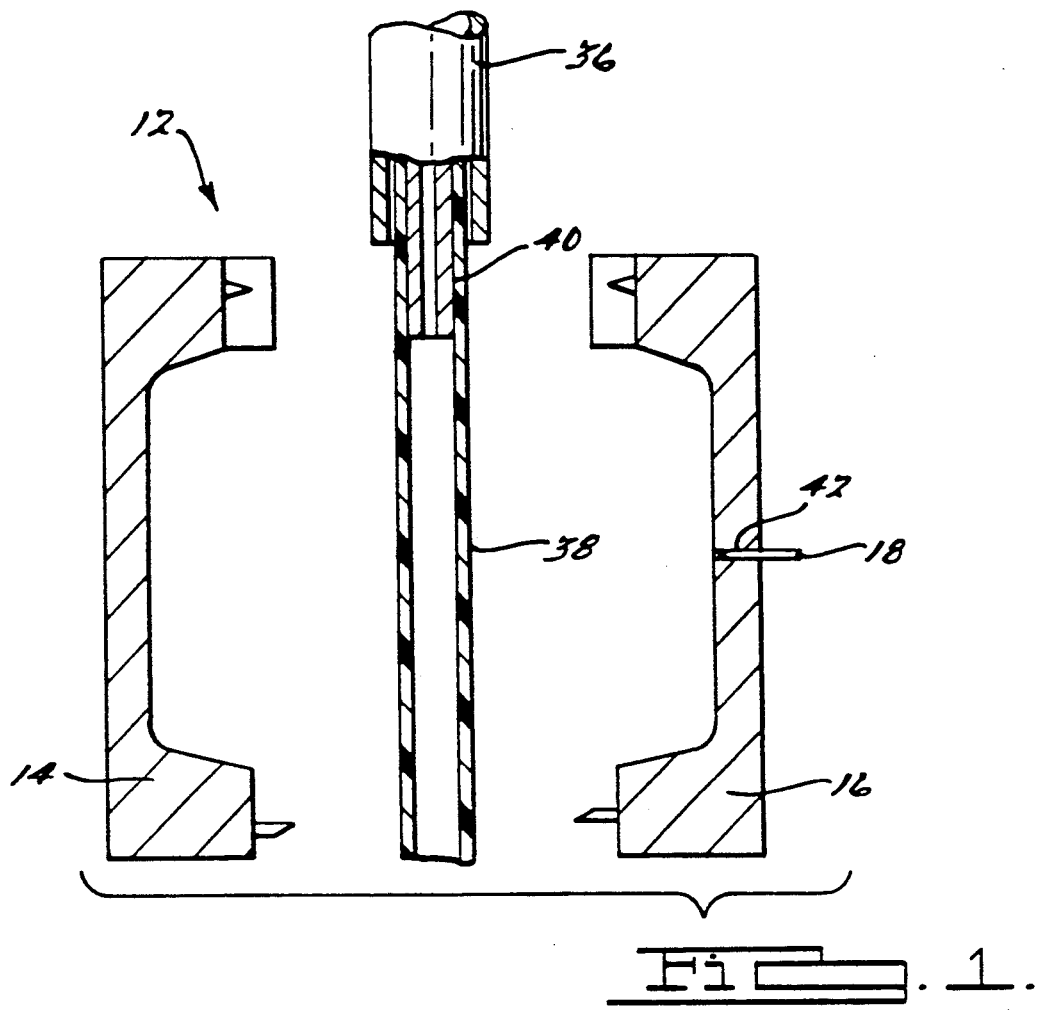
FIGS. 1-3 illustrate the operation of an apparatus in accordance with the invention.
Figure 2:
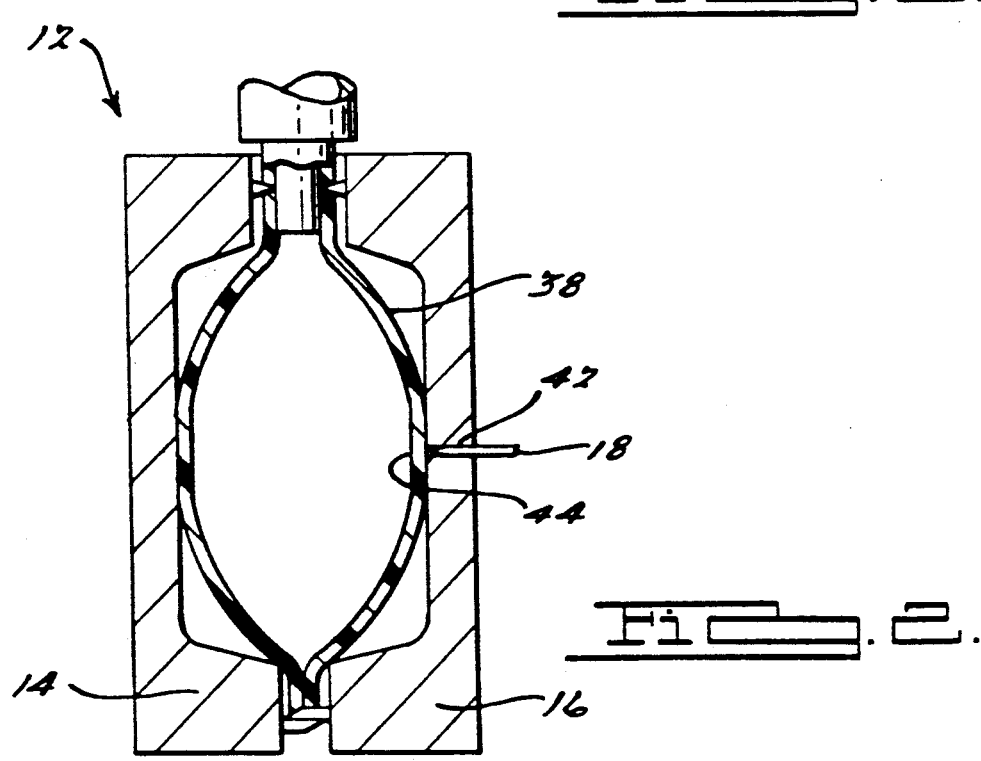
Figure 3:
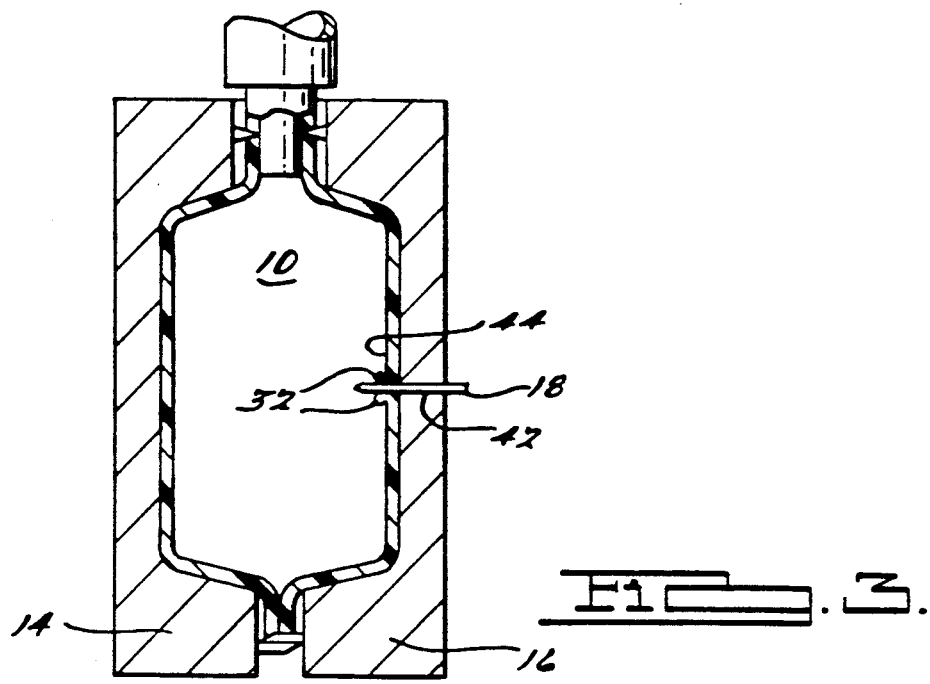

Illustrated in FIGS. 1-3 is a method of blow-molding a fuel tank using the apparatus and methods taught by the present invention. A mold 12, having operable die pieces 14,16, is used to blow-mold fuel tank 10. Extruder 36 extrudes a length of parison sufficient to fill the mold cavity. Mandrel 40, preferably concentric within extruder 36, provides sufficient air to partially inflate parison 38. A passage 42 within die piece 16 receives blow-molding needle 18. As is well known in the art, blow-molding needle 18 is selectively movable between a retracted and extend position within passage 42. Needle 18 is shown in a retracted position in FIG. 1. Die pieces 14,16 are moved to the closed position as shown in FIG. 2. Parison 38 is pinched closed at its top and bottom portions. Parison 38 is generally inflated through mandrel 40 sufficiently for parison wall section 44 to extend in the vicinity of passage 42. Blow-molding needle 18 is preferably positioned perpendicular to parison wall section 44.

Blow-molding needle 18 is attached to a source of pressurized fluid and is operable to move within passage 42. Blow-molding needle 18 may be reciprocally driven by a variety of mechanisms including hydraulic and pneumatic cylinders, motors and solenoids as are well-known in the art. Blow-molding needle 18 is extended within passage 42 and pierces parison wall section 44. As will be more fully described in FIGS. 4 and 5, blow-molding needle 18 pierces parison wall section 44 and cuts parison 38 to form triangularly-shaped flap sections 32. Needle 18 pushes flap sections 32 against the interior of parison wall section 44.

Flap sections 32 are pushed within parison 38. Pressurized fluid is introduced through blow-molding needle 18 to completely inflate parison 38 into the desired fuel tank shape. Two or more blow-molding needles may be used to ventilate the space within fuel tank 10 with pressurized fluid. When ventilating a blow-molded article, pressurized fluid is introduced through one needle and ventilated through another needle. Fluid passes from the interior portion of the blow-molded fuel tank 10 into and through blow-molding needle 18.

Figure 4:
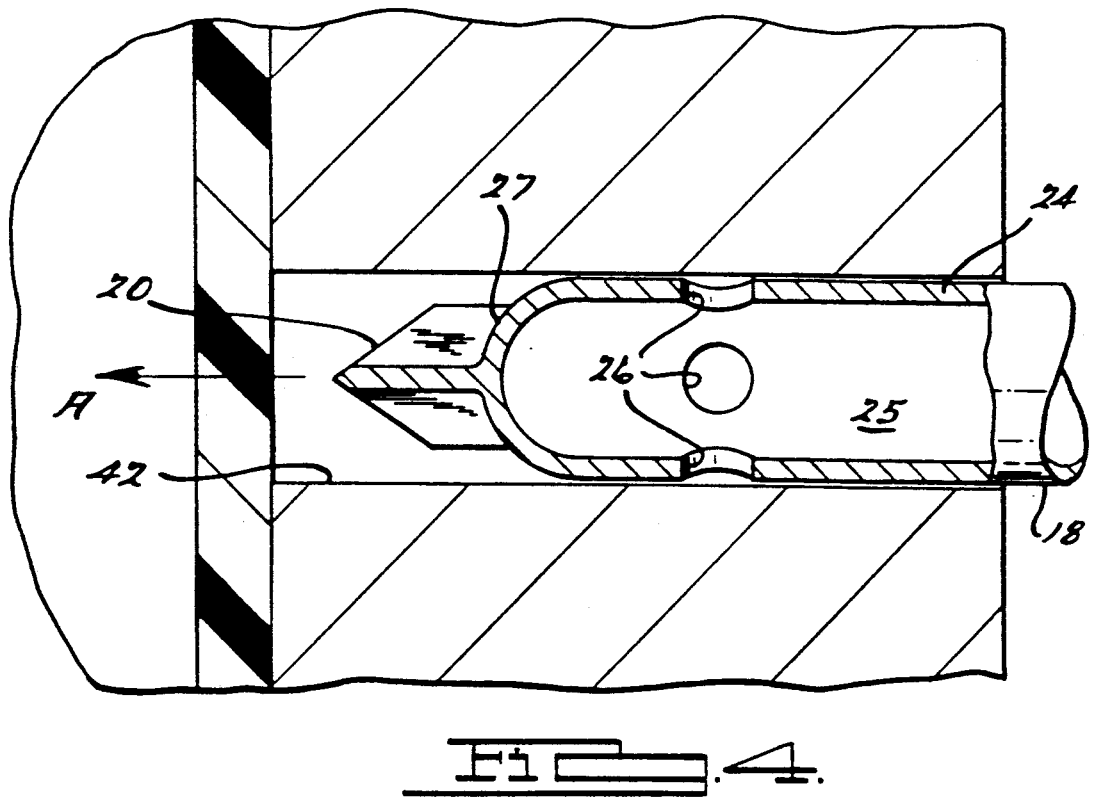
FIG. 4 is a close-up view of a portion of the apparatus shown in FIG. 2.

Shown in FIGS. 4 and 5 are detailed sectional views of blow-molding needle 18 and parison wall section 44. Blow-molding needle 18 comprises a tubular portion 24 having passage 25 therethrough and terminating in an arrowhead-shaped cutting tip 20. Needle 18 may be threadedly engaged at its opposite end to an actuating-/ventilating means (not shown). The actuating means (not shown) is selectively engageable to move needle 18 between a retracted and extended position within passage 42.

The end of tubular portion 24 in the vicinity of cutting tip 20 is sealed to the passage of fluid. Positioned near cutting tip 20 are four passages 26 for inflating and ventilating parison 38. Passages 26 are positioned approximately perpendicular to needle centerline A. The number and area of passages 26 is selected to have a total area equal to or greater than the cross-sectional area of passage 25 so as to avoid constricting the flow of fluid through needle 18. Cutting tip 20 comprises four blades 22 as shown in FIGS. 7 and 10. Blades 22 form a cross-shape and terminate in a sharp point. A knife edge 23 provides a cutting surface along each blade 22. Knife edge 23 engages parison wall section 44 and cuts through parison 38 as needle 18 is moved to the extended position.

A four-bladed cutting tip has been found useful with blow-molding needles having an approximately three-quarter inch exterior diameter and a parison wall section thickness of approximately 6 mm. A three-bladed cutting tip is believed sufficient when using smaller diameter blow-molding needles or a thinner walled parison. A five or more bladed cutting tip is believed useful for blow-molding needles larger than 1.5 inches or parison wall thicknesses greater than 6 mm.

Blow-molding needle 18 is moved to its extended position as shown in FIGS. 5 and 6. Cutting tip 20 pierces parison wall section 44. Blades 22 cut Parison 38 in a cross-shaped pattern and penetrate parison 38. Flap sections 32 are formed in parison wall section 44. Flap sections 32 are pushed inwardly by shoulder 27 on cutting tip 20. Needle 18 is projected beyond parison wall section 44 sufficient for passages 25 to communicate with the interior of parison 38. Parison 38 is inflated into fuel tank 10 with a pressurized fluid passing through passages 25. Additionally, parison 38 may be ventilated by passing fluid from another blow-molding needle (not shown) into parison 38 and out passages 25.

After fuel tank 10 has been inflated and allowed to form into its desired shape, blow-molding needle 18 is moved to a retracted position within passage 42. Mold die pieces 14,16 are opened and fuel tank 10 is removed from mold 12.

The invention has been illustrated using a linear blow-molding needle 18. It is desirable to position blow-molding needles 18 in a area of parison 38 which will be subsequently cut out to receive an attachment such as a fuel filler neck or vapor vent valve.

The invention as described is suitable for use with conventional blow-molding equipment. Two or more blow-molding needles may be simultaneously or sequentially extended to penetrate a parison. By placing passages 26 perpendicular to a centerline A and away from cutting tip 20, debris is less likely to enter the blow-molding needle. Maintenance of the blow-molding equipment is thereby reduced.

The invention has been described in terms of blow-molding an automotive fuel tank. However, the methods and apparatus of the present invention may be adapted to form other blow-molded articles for both automotive and non-automotive applications. It is understood that various modifications of the preferred embodiments may be used without departing from the scope of the invention. Claims appended hereto are intended to cover all such changes and modifications.

We claim:

1. An apparatus for producing a blow-molded article comprising:
   a mold having operable die pieces, a first passage through at least one said die piece for receiving a needle;
   said needle comprising a tubular portion and a cutting tip atop said tubular portion, said cutting tip having three or more blades terminating into a point, and being closed to the passage of air, said tubular portion having one or more second passage(s) perpendicular to said tubular portion and spaced far enough away from said cutting tip to prevent debris from entering said second passage and communicating with source of pressurized fluid;
   means operating said needle to pierce a parison within said mold; and
   means to supply a volume of air to said one or more second passage(s) to blow mold said parison.

2. The apparatus of claim 1, wherein said operating means includes a cylinder attached to said needle which moves said needle linearly into said parison.

3. The apparatus of claim 1, wherein said cutting tip comprises an arrow shape.

4. The apparatus of claim 3, wherein said cutting tip has four or more blades.

5. The apparatus of claim 1, wherein the area of said second passage is sized to be approximately equal to the area of said first passage.

6. The apparatus of claim 5, wherein said second passage is located perpendicular to the tubular portion center-line.

7. A method of manufacturing a blow-molded article comprising the steps of:
   positioning a hollow parison within a cavity of a mold;
   closing said mold about said parison;
   providing an arrow-tipped needle having a tubular portion and a cutting tip atop said tubular portion, said cutting tip having three or more blades terminating into a point;
   moving said needle to pierce said parison, said needle penetrating through said parison and said three or more blades forming at least three flap sections therein;
   pushing said flap sections inwardly by the movement of said needle during penetration of said parison; and
   introducing fluid through said needle and into said parison for inflating said parison outwardly after the step of pushing said flap sections inwardly.

8. The method of claim 7, wherein said needle moves linearly.

9. The method of claim 7, wherein said introducing step includes injecting pressurized gas into said parison so that said parison assumes the shape of said cavity.

10. The method of claim 9, further comprising ventilating said parison through said needle after the step of injecting pressurized gas into said parison.

11. The method of claim 10, wherein said ventilating step further includes exhausting gas through said needle.

12. The method of claim 7, wherein two or more needles are moved to pierce said parison.

* * * * *